July 12, 1932. M. SALINAS 1,866,949
MEANS FOR SHELLING COTYLEDONOUS VEGETABLES
Filed April 17, 1930
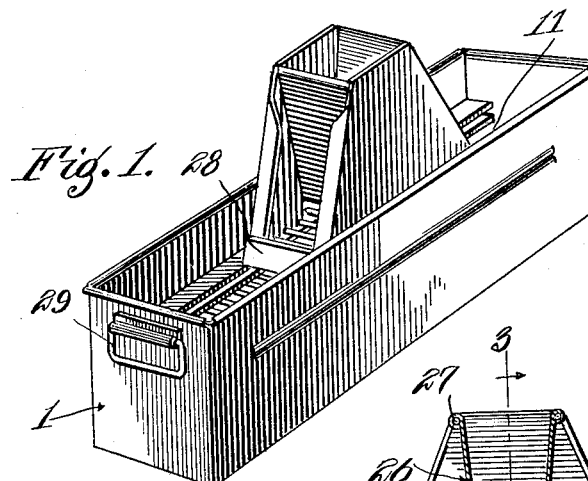
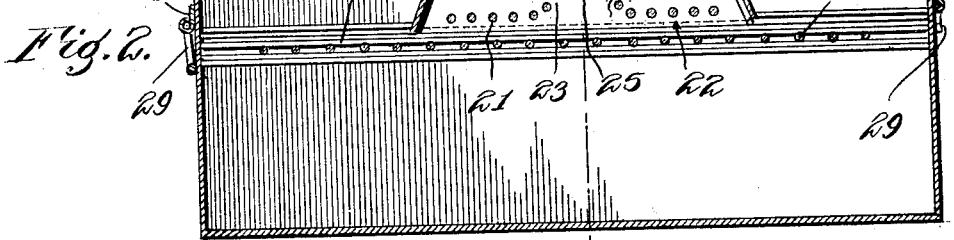
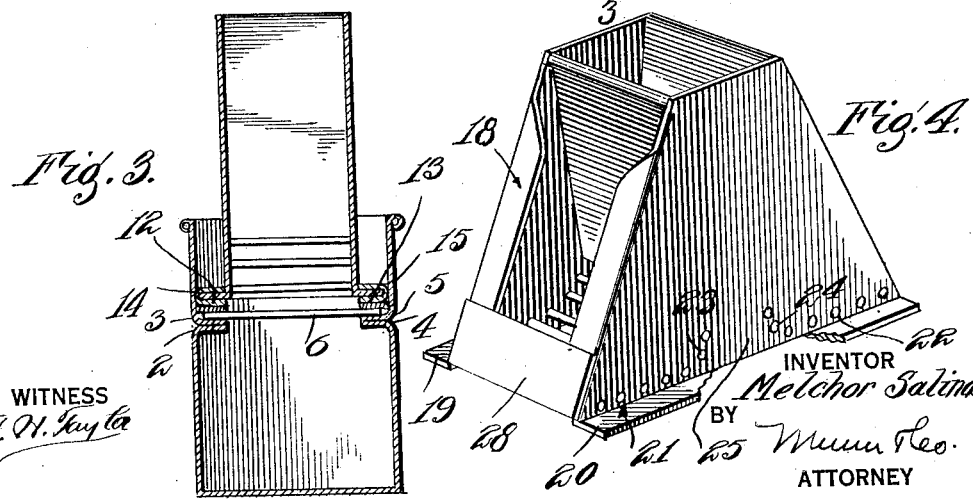
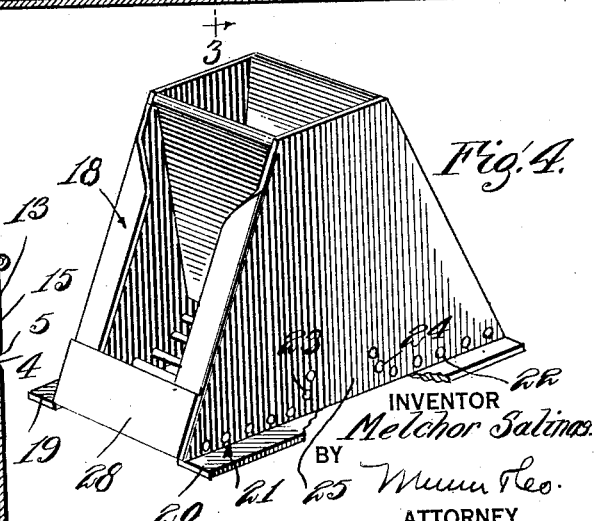
INVENTOR
Melchor Salinas.
BY
ATTORNEY
WITNESS Patented July 12, 1932

1,866,949

UNITED STATES PATENT OFFICE

MELCHOR SALINAS, OF MONTEREY, MEXICO

MEANS FOR SHELLING COTYLEDONOUS VEGETABLES

Application filed April 17, 1930, Serial No. 444,998, and in Mexico April 13, 1929.

My invention relates to means for shelling cotyledonous vegetables, more particularly to means for shelling cotyledonous vegetables of the dicotyledonous type and it consists in the combinations, constructions and arrangements herein shown and described.

An object of my invention is to provide a simple machine which by a simple operation divides the cotyledonous vegetable into its cotyledons or breaks the cotyledons into small parts and then separates the kernel of the vegetable from the cotyledonous hulls or shells.

A still further object of my invention is to provide a device of the type described which is adapted for the use of separating means other than that utilized in conjunction with the means shown for breaking the cotyledonous shells previous to the separation thereof.

A still further object of my invention is to provide a device of the type described which has few parts, is simple to manufacture and does not get out of order easily.

Other objects and advantages will appear as the specification proceeds and the invention will be more particularly described in the appended claims.

My device is illustrated in the accompanying drawing forming a part of this application, in which Figure 1 is a perspective view of my device, Figure 2 is a longitudinal sectional view of the invention, Figure 3 is a transverse sectional view on line 3—3 of Figure 2, and Figure 4 is a perspective detail view of a portion of the device.

In carrying out my invention I make use of a metallic box 1 which may be of any suitable shape or size, but which is shown as consisting of an elongated rectilineally shaped box having an open top. This box is adapted to receive and retain water for a purpose that will soon appear.

To support the mechanism for performing the shelling operation, this box is provided with the inwardly projecting shoulder portions 2, 3, 4 and 5 which may be struck out by any suitable method, such as stamping from the walls of the box.

The inwardly projecting shoulders 3 and 5 support on their upper surface a series of transversely extending bars 6, which may be formed of wire or any other suitable material and which comprise in their entirety a grate 7. It will be noted that these grate bars 6 terminate at either end of the series in spaced relation with the end walls 8 and 9 of the box leaving openings 10 and 11 between the grate and these end walls for a purpose soon to be described.

Elongated strips or bars 12 and 13 are placed on top of the grate bars 6 for securing the same in close fixed relation with the shoulders 3 and 5. These members 12 and 13 may have recesses for engaging the grate bars to secure the same in fixed longitudinal position. Suitable recesses might also be provided in the top surfaces of the shoulders 3 and 5 for similar purposes, if desired.

For supporting the movable member of the shelling mechanism guides 14 and 15, providing guide-ways 16 and 17 are mounted on top of the members 12 and 13. These guides may be secured in position by any suitable means desired.

For cooperation with the guides 14 and 15 and the grate 7 to perform the shelling operation, I provide the member 18 having guides 19 and 20 projecting in the base thereof for sliding engagement in the guide-ways 16 and 17 of guide members 14 and 15. This member, as can easily be seen is of lesser longitudinal extent than the box 1 and consequently is adapted for reciprocating motion in the guides 14 and 15 or relative to the box 1, and the grate 7.

This member 18 has two series of bars 21 and 22 forming that portion of my apparatus which I term the movable grate. These series of bars 21 and 22 may be formed of bars similar to those indicated at 6 forming the grate 7 or in any other suitable manner as desired. It will be noted that the inner ends 23 and 24 of these series 21 and 22 extend upwardly and are in spaced relation to one another leaving an opening 25 to permit passage through said space 25 of the cotyledonous vegetables to the space between the stationary grate 7 and the movable grate formed by the series of bars 21 and 22.

For feeding the cotyledonous vegetables through this space 25 and upon the grate 7 for the shelling operation, the member 18 is provided with a hopper 26, the outlet of which communicates with the space 25. This hopper 26 is mounted at its mouth 27 on the walls of the movable member 18 in any suitable fashion.

The end walls of this member 18 are left open with the exception of small foot plates 28 at the base thereof, to permit the escape of vegetables, which have been operated upon. Suitable handles 29 may be provided on the box for the easy handling and transportation thereof.

From the foregoing description the use and operation of my device is easily understood. The box 1 is first filled with water to any desired level. The operator then feeds the cotyledonous vegetables or other matter to be worked upon through the hopper 26 into the space between the movable grate and the stationary grate. He then reciprocates the movable member 18 in its guides 14 and 15 by manual means or otherwise, wedging the vegetables between the movable grate and the stationary grate and stripping the kernels or other useful portions of the vegetables of their hulls or shells.

The broken or shelled vegetable after the shelling operation passes between the bars of the stationary grate as well as the bars of the movable grate and into the body of water in the box 1. Those vegetables passing through the stationary grate drop directly into the water while those passing through the movable grate pile up above the foot plates 28 until they escape thereover and fall upon the stationary grate. If they do not pass through said stationary grate they are forced by the foot plates 28 to the spaces 10 and 11 during the reciprocation of the member 18 and pass through said space into the body of water in the box 1.

The water automatically separates the kernel or other useful portion of the vegetables from the hull or shell because of the difference in specific gravity of these two portions. The kernel or useful portion sinks to the bottom while the hulls or shells float on the water. Any means desired may be utilized to remove said hulls from the water and said kernels or useful portions from the bottom of the box 1.

My device is well adapted without great modification for the utilization of mechanical or other means for the separation of the kernel or other useful portion of the vegetable from the hull or shell rather than the water method shown. This is allowed by the provision of the large space in the box below the stationary grate in which any suitable mechanism or other device for performing the separating operation could be housed without extensive alterations being necessary.

It is thus seen that I have provided a machine for shelling vegetables or for working upon any material suitable to the operations carried out by this machine which is particularly adapted for the shelling of cotyledonous vegetables.

It is also seen that I have provided a machine of the type described which may be readily adapted for cooperation with other forms of mechanism adapted to perform a part of the operation.

What I claim is:

1. In a machine for shelling cotyledonous vegetables and the like, a water tank having a stationary grate, said grate being spaced from the end walls of said tank to provide openings, a movable grate positioned above said stationary grate and adapted for cooperation therewith to break the shells of the vegetables, means for feeding the vegetables between said grates, and walls positioned at the ends of said movable grate to engage the vegetable after the breaking of the shell to force the same through the openings at the end of said stationary grate.

2. In a shelling machine for vegetables or the like, a water tank adapted for the reception of the vegetables, a stationary grate positioned on top of said tank and spaced from the ends thereof providing openings, a movable grate positioned above said stationary grate and including a hopper for feeding the vegetables between said grates, said grates being adapted for cooperation to break the shells of the vegetables, and means carried by said movable grate for moving and discharging the broken shells of the vegetables through the openings at the ends of said stationary grate.

3. In a shelling machine for vegetables or the like, a water tank adapted for the reception of the vegetables, a stationary grate positioned on top of said tank and spaced from the ends thereof providing openings, a member slidably disposed above said stationary grate and including a hopper, grate bars carried by said member and adapted for cooperation with said stationary grate, certain of said bars defining guide means between said hopper and said stationary grate whereby to feed vegetables between said grate and the grate bars of said member, and walls positioned at the ends of said member to engage the vegetables after breaking of the shells to force the same through the openings at the ends of said stationary grate.

MELCHOR SALINAS.